United States Patent [19]
Wichterle et al.

[11] 3,862,452
[45] Jan. 28, 1975

[54] HYDROGEL SUBSTITUTES FOR TUBULAR SOMATIC ORGANS

[75] Inventors: Otto Wichterle; Karel Kliment; Jiri Vacik; Zdenek Ott; Miroslav Stol, all of Praha; Jan Dvorak, Brno, all of Czechoslovakia

[73] Assignee: Ceskoslovenska akademie ved, Prague, Czechoslovakia

[22] Filed: June 21, 1971

[21] Appl. No.: 155,318

Related U.S. Application Data

[62] Division of Ser. No. 633,697, April 26, 1967, abandoned.

[30] Foreign Application Priority Data

May 4, 1966 Czechoslovakia ............... 2992-66

[52] U.S. Cl. .................. 3/1, 3/DIG. 1, 128/334 R

[51] Int. Cl. ............................................. A61f 01/00
[58] Field of Search ............ 128/334 R, 335, 335.5; 3/1, DIG. 1

[56] References Cited
UNITED STATES PATENTS

| | | | |
|---|---|---|---|
| 3,220,960 | 11/1965 | Wichterle et al. ............ | 128/334 X |
| 3,272,204 | 9/1966 | Artandi et al. ................. | 128/334 R |
| 3,520,949 | 7/1970 | Shepherd et al. ............ | 128/334 R X |

*Primary Examiner*—Dalton L. Truluck
*Attorney, Agent, or Firm*—Murray Schaffer

[57] ABSTRACT

Substitute somatic organ comprising an insert formed of a tubular knitted textile material and an outer covering bonded to it. The outer covering comprises a hydrogel polymerized about the textile insert in situ.

3 Claims, No Drawings

HYDROGEL SUBSTITUTES FOR TUBULAR SOMATIC ORGANS

This application is a division of application Ser. No. 633,697, filed Apr. 26, 1967, now abandoned and claim is hereby made to all of the equitable and legal benefits derivable from each.

The invention relates to substitutes for tubular somatic organs, provided with knitted textile reinforcements, and a method of preparing the same.

Various methods of employing plastics, such as, for example hydrogels from co-polymers of glycol methacrylate and glycol-bis-methacrylate for prosthetic purposes are known. The aforementioned hydrogels have proved outstanding characteristics for applications in human organisms and, moreover, they possess the additional advantage of having been subjected for many years to a great number of tests which have fully proved their physiological harmlessness. One of the aims surgical research men have devoted a great deal of their energy to for a long time, is directed toward appropriate substitutes for some tubular organs of the human body. Thus, for example, for a couple of years there have been tested substitutes for various blood vessels where in case of an aneuryism, or forcedly interrupted blood circulation (caused e.g. by a limb trauma) it is necessary to renew the blood circulation through the affected aorta or artery, especially the thoracic or abdominal aortae as well as arteries of the limbs. The substitution can generally be made in three different ways: by auto-implantation, homoeoimplantation, and alloimplantation. The last mentioned mode which consists in applying a blood vessel manufactured from suitable synthetic materials, more particularly from a knitted fabric made of physiologically unobjectionable synthetic fibres, has been clinically tested and appears to suit fairly well to the purpose. Nevertheless, not all of the aforementioned materials are fully suitable to be implanted in the human body, since the requirements the respective materials have to meet are very rigorous. These requirements may be set forth as follows:

The material has to be chemically inert, has to possess good mechanical properties, must not be physically or chemically attackable by somatic fluids, must not cause inflammatory affections of the tissues, or react to foreign matter (corpora aliena), must not provoke allergic as well as hypersensitivity symptoms, and must not exhibit cancerigenic effects. Moreover, the tubular organ substitutes must meet some other requirements, such as a reduced wall porosity, resistance to choking when bent, and excellent compatibility with somatic liquids. Among most successful blood vessel substitutes developed as yet there may be cited products made of polyacrylonitrile, polyester, polytetrafluorethylene fibres, and a combined collagen-polyester product. Nevertheless, in applying such blood vessel substitutes considerable problems are faced, of which the most serious is a relative great wall porosity causing a strong hemorrhage upon releasing the full blood pressure thereinto. The pre-coagulation of blood on the wall of such blood vessel substitutes, which is to overcome said shortcoming, is a time-consuming process and due to the waste of blood, it can hardly be recommended.

Other special problems which surgery has to solve in the future consists in the substitution of urinary, lymphatic, biliary, respiratory ways, the substitution of Fallopian tubes or renewal of a free passage therethrough, and the substitution of some tubular organs in ophtalmology, otorhinolaringology, and the like.

An object of the present invention is to provide substitutes for the aforementioned tubular organs, tubular drains, protective bandages, and other medically usable tubes, consisting substantially of a hydrogel on the basis of hydrophilic polymers, as, for example copolymers, such as copolymers of monomethacrylate and dimethacrylate of glycols, provided with a textile reinforcement, preferably knitted from physiologically harmless synthetic fibers, for example polyester rayon. Such a combination meets all the said requirements and can moreover easily be prepared, since the textile reinforcement can easily be interpolymerized into the hydrogel basis so that the final interconnection of the two constituents is perfectly intimate, the reinforcement avoiding contact with live tissue and somatic liquids unless if the latter diffuses through the hydrogel. As hereinbefore referred to, the textile reinforcement can be interpolymerized into the hydrogel by using some known methods, such as, for example, rotary or centrifugal casting or impregnating it in a bath followed by polymerization, or the like. The hydrogel basis with which the textile reinforcement is to be interpolymerized into and with which it forms an integral body can be prepared in any of suitable processes by using a basic hydrophilic monomer containing one polymerizable double bond in each molecule, a cross-linking agent may be included which is to be hydrophilic, too, but at least soluble in the monomer mixture to such an extent lest it may be separated as a particular phase before the co-polymerization has been finished. The amount of of the cross-linking agent is to be up to 2 per cent by weight of the basic monomer used. The cross-linking agent should contain at least two polymerizable double bonds in each molecule.

A suitable example of the basic monomer and the cross-linking agent is ethyleneglycol monomethacrylate and ethyleneglycol-bis-methacrylate, respectively. It is to be understood that other suitable hydrophilic monomers can be used for the purpose, provided they are hydrophilic, physiologically inert, and have good mechanical properties if water-swelled. It is more than probable that in the future some more stable and inert hydrogels will be found, since a large quantity of these substances are already known and could as well be prepared in a synthetic way. In lieu of the ethylenglycol monomethacrylate there can be employed diethylenglycol monomethacrylate or monomethacrylates of higher glycolethers, as for example glycerol, or other polyhydric alcohols. Acrylates can be used in these cases as a replacement of methacrylate even when they do not possess such a stability in various chemical and physical conditions. The cross-linking agent can be, for instance, a mixture of dimethacrylate and trimethacrylate of glycerol or n,n'-methylene-bis-methacrylamide, or the like.

ester filaments, enhances the mechanical properties of the hydrogel, and particularly acts to reduce the elongation value thereof, the substitute from being deformed or damaged. Moreover, it assumes an important task, namely to enable the attachment of the substitute to a live tissue by means of stitches without being mechanically impaired. The knitted textile reinforcement having the same order of elongation value as the hydrogel can be made of polyethylene terepthalate, fibrous polyacrylonitrile, polytetrafluorethylene, and the like.

A suitable catalyst for starting the polymerizing reaction is di-isopropyl peroxocarbonate, di-ethyl peroxocarbonate, a mixture of ammonium persulphate or potassium persulphate and dimethylaminoethyl acetate, or a mixture of potassium persulphate and pyrosulphite or sodium, thiosulphate, or the like, accompanied by small quantities of trace metals, such as copper, iron, or the like; or p-toluensulphic acid and its derivates as well as other known compounds easily liberating free radicals.

The deposition of a thicker hydrogel layer may be facilitated by increasing the viscosity of the mixture to be polymerized by adding an inert polymer thereto, which polymer is soluble in this mixture. For this purpose there is suitable a physiologically inert high linear polymer having a great value of molecular mass, as for example, non-cross-linked polymeric ethyleneglycol methacrylate.

Viscosity can further be increased by simultaneously submerging a plurality of tubular hoses made of textile reinforced knitwork, into a catalyst monomer mixture of which the polymerization rate is known under given conditions and which is held in an inert gaseous medium and under simultaneous viscosity and/or temperature control. When the viscosity attains a sufficient value abrupt gelatination, all the hoses are removed from the bath at once, and the polymerization is then finished in an inert gaseous medium, possibly under contributory treatment by infrared, or ultraviolet rays. The polymerization can be accelerated by prior irradiation of the textile reinforcing material by X-rays, or gama-rays. In this case, however, there exists a danger of premature gelatination before the knitted hoses have been removed from the monomer mixture bath.

EXAMPLE I.

Substitute for a blood vessel (artery)

The knitted blood vessel substitute made of polyethylene terepthalate and having a diameter of 9 millimeters was twice boiled in distilled water, dried in 60° Centigrade warm air in a drier, and impregnated in a monomer mixture bath contained in a glass cylinder. Thereafter it was transferred into a specially adapted glass cylinder communicating with a suitable source of inert gas (carbondioxide, nitrogen, argon or the like), where it was hung on a hook. The surplus monomer mixture was dropped onto the bottom of the glass cylinder. After the interior of the cylinder had been filled up with the inert gaseous medium, the cylinder wall was being successively heated, preferably by hot air at a temperature of about 80° Centigrade. The polymerization proceeded for a time period of about 30 minutes. Thus the monomer mixture was converted into the gel phase. This procedure was then repeated once more, the impregnated hose having been hung by its other end. Thus a uniform gel deposit on the hose wall was secured.

The monomer mixture was composed of the following constituents: 70 per cent by vol. monoethyleneglycol methacrylate monomer containing 0.28 per cent by vol. monoethylenglycol-bis-methacrylate, and 30 per cent by vol. distilled glycerol including 0.35 per cent by vol di-isopropyl peroxocarbonate as the starting catalyst. Before having been used, the monomer mixture was degasified by means of oil air pump at a temperature ranging between minus 10° to minus 15° Centigrade and a pressure of about 0.1 Toor for a period of 5 minutes, whereby the oxygen content inhibiting the polymerization was removed from the mixture. The blood vessel substitute was then several times boiled off in distilled water and put in the sterile physiological solution with an admixture of heparin. Moreover, it is recommended to add suitable antibiotics to the storing solution, preferably antibiotics having a wide bacteriostatic range, such as, for example, tetracyclinhydrochloride, or the like. In order to extend the local effect of the antibiotic agent for the entire recovery period it is possible to form first a hydrogel layer, to dust it, prior to its reaching the gel point, with a poorly soluble granular drug, such as tetracycline free base, and then to cover the gelified hydrogel with another one in the same way. The antibiotic agent will then diffuse successively into the adjacent tissue as well as into the circulating blood.

According to another alternative, a finely pulverized poorly soluble antibiotic agent or any other remedial means is mixed with the solution of a non-cross-linked polymer, as hereinbefore referred to, as for example, ethylenglycol monomethacrylate polymer in an alcohol, whereupon the resulting suspension will be applied to the base hydrogel layer, precipitated by water mist, and finally applied to the top layer of catalyst monomer mixture; the polymerization will then proceed as hereinbefore described.

EXAMPLE II

Urethra substitute.

In the procedure corresponding to the described in EXAMPLE I another composition of monomer mixture was chosen:

80 per cent monothyleneglycol monomethacrylate, 20 per cent di-ethyleneglycol monomethacrylate (containing 0.26 per cent di-ethyleneglycol-bis-methacrylate) and 0.35 per cent di-isopropyl peroxocarbonate. The textile reinforcement was boiled off in distilled water and put in a sterile physiologic solution with an admixture of suitable antibiotics.

EXAMPLE III

Blood vessel substitute.

Onto a horizontally arranged mandrel made of Teflon (Registered Trademark) and adapted to be internally heated by means of a resistive heating device to a temperature of about 60° to 70° Centigrade, a knitted textile reinforcement having a diameter of 9 millimeters was donned after having been previously submerged into the monomer mixture, as in EXAMPLE I, and polymerized under a low speed rotation in an inert gaseous medium for a time period of about 20 to 30 minutes. The procedure is be repeated twice or several times until the desired thickness of the polymerized layer is attained. The product was then removed from the mandrel, boiled off in distilled water and stored under sterile conditions in the physiologic solution.

EXAMPLE IV

Blood vessel substitute.

Onto avertically positioned mandrel made of Teflon (R.T.M.) as in EXAMPLE III, a knitted textile reinforcement of polyester rayon was donned, whereupon it was helically wrapped up in a thin strip of polyethylene foil; into the space between the mandrel and said strip the monomer mixture, as in EXAMPLE II, was then sucked in and the mandrel was heated by the resistive heating device, as in EXAMPLE III. In this case the mandrel was not rotated, but kept in its original vertical position until the polymerization had been finished. The polyethylene strip was then wound off after the polymerization, whereupon the resulting substitute was thoroughly rinsed in water, sterilized by boiling and stored in the physiologic solution under sterile conditions.

EXAMPLE V

Suction drain for cerebro-spinal liquid.

Into a glass tube of which one extremity was sealed and the interior was provided with a special paraffine coating, there was sprayed a freshly prepared monomer mixture composed of 80 per cent by vol. of a mixture of monomers (comprising 90 per cent monoethyleneglycol monomethacrylate cross-linked with 0.32 per cent monoethyleneglycol-bis-methacrylate), 15 per cent by vol. ammonium persulphate in 2 per cent aqueous solution, and 5 per cent by vol. dimethylaminoethyl acetate. The air content was immediately blown off by an inert gas, as for example by means of a polyethylene capillary tube and the open end of the capillary tube was sealed in the flame of the Bunsen or any other burner. The glass tube was then centered and clamped directly on to the shaft of a high speed electric motor having for example 8.000 r.p.m., and set in rotation. In 15 minutes the polymerization was finished.

One of the glass tube ends was cut off so that after melting the thin paraffin layer the polymerized hydrogel tube could be pulled out of the glass tube. Before the lastmentioned operation there was sprayed into the interior of the hydrogel tube a mixture comprising 30 per cent by vol. monoethyleneglycol monomethacrylate with 1 per cent cross-linking admixture, and 70 per cent by vol. ammonium persulphate in 10 per cent aqueous solution so that the interior of the tube might have been entirely filled up. The glass tube was then heated in an aqueous bath to a temperature of about 60° Centigrade for 20 to 30 minutes. In the interior of the glass tube there was produced a finely porous sponge which after having been removed from the glass tube was several times boiled off in distilled water. The flow rate of the prepared drain was about 1.1 milimeters per minute (when measured at an overpressure of 100 milimeters distilled water column). The sterile drain is introduced into an aperture trepanned in the cranial cavity in the area of the excessive accumulation of the cerebro-spinal fluid (as e.g., in case of encephalitis) while the other end thereof is introduced into the jugular vein where, as well-known, a slight underpressure of about 100 millimeters water column prevails. Thus the suction of the cerebro-spinal liquid into the blood circulation can be accomplished.

EXAMPLE VI

Substitution of auditory ossicles (mechanical sound transmission).

A tube having a diameter ranging from 2 to 2.5 milimeters made as described in EXAMPLE V, but without spongious lining, can replace the auditory ossicles in that one of the tube ends is polymerized on to the tympanum while the other end is pulled over the malleus stump. The elasticity of the hydrogel tube can re-establish the mechanical sound transmission.

EXAMPLE VII

Substitution of oviducts (Fallopian tubes) or renewal of free passage therethrough.

A hydrogel tube as made in Example V of a suitable diameter, preferably reinforced by a textile knitwork having a perfectly smooth superficial structure is used as a substitute for the Fallopian tube, enabling thus to attain pregnancy in the indicated cases. The inner surface of the substitute, as hereinbefore said, has to be perfectly smooth.

EXAMPLE VIII.

Renewal of free passage through the main lachrymal canal (ductus nasolecrimalis).

A parallell arranged bundle of polyester filaments, preferably crimped, was put in a glass tube of a suitable inner diameter, into which a mixture of 30 per cent monoethyleneglycol methacrylate containing 1 per cent monoethyleneglycol-bis-methacrylate, and of 70 per cent monoethyleneglycol-bis-methacrylate, and of 70 per cent by vol. ammonium persulphate in 10 per cent aqueous solution, was poured. One end of the auxiliary tube extended by a piece of rubber hose pulled thereover was pinched by a clip and the tube was put in a drier heated to a temperature of about 60° to 70° Centigrade for about 25 to 30 minutes. Thus a sponge was produced having the reinforcing bundle of polyester filament therein, which sponge could be pulled out of the glass tube. The product was boiled off several times in distilled water and stored in the physiologic solution.

EXAMPLE IX

Ophtalmologic bandage for therapy of separated retina.

An analogous product as described in EXAMPLE VIII was prepared excepting that the reinforcement used was made of special crocheted or knitted chain strand which is ladder-proof, that means that after severing to shorter lengths it cannot be unravelled or untwined. The sterilization was made as hereinbefore set forth. Before using a desired piece of the block is cut-off and fastened around the eye bulb whereby the separated retina can re-occupy its original position and grown thereon.

EXAMPLE X

Protective capsule for nerve bundles.

A hydrogel tube of a suitable inner diameter was prepared in the well-known process of rotary or centrifugal casting, as described in EXAMPLE II, which tube was sterilized and stored in the physiologic solution. Before application a necessary length of the tube was cut-off and was pulled over the interrupted nerve bundle which was then connected with the other end of the broken bundle whereupon the tube was pulled over the joint. Thereby intergrowths with the ambient live tissue can be prevented, since the hydrogel cannot intergrow through a live tissue. In this manner it is possible to reestablish the nervous contact, the resilient hydrogel tube showing no obstacle to being bent.

EXAMPLE XI

Substitute for a vein.

A hose knitted of polyacrylonitrile crimped filaments was severed to a plurality of 10 to 15 centimetres long sections which were hung on a horizontal grid made of anticorrosive steel, or a plastic, and arranged to be easily lifted above the level of the monomer solution. The grid with the knitted hoses hung therefrom was positioned in a great-diameter glass cylinder supplied permanently with carbondioxide. In the central portion of the grid there was provided a hole to receive the shaft of an agitator driven from a small-output D.C. electric motor adapted to serve as a simple viscosimeter in that energizing current and/or revolutions could be recorded.

Alternately, an A.C. electric motor having constant revolutions can be employed for this purpose; in this case there is recorded the input only. Moreover, the cylindrical vessel was provided with a highly responsive recording thermometer. The monomer mixture cooled to minus 10° Centigrade was poured, into the vessel the grid having been placed into the lowermost of bottom position. The mixture was composed of 60 per cent by weight ethyleneglycol monomathacrylate, 19 per cent boiled-off and cooled distilled water free of oxygen, 19 per cent diethyleneglycol monomethacrylate, one per cent potassium pyrosulphite in 2 per cent aqueous solution, one per cent ammonium persulphate in 2 per cent aqueous solution, with an admixture of 5 drops of 0.1 per cent copper (I) chloride solution per 250 mililitres of monomer mixture. Air bubbles were removed by a partial evacuation of the vessel and by repeated lowering of the grid together with the hoses down to the vessel bottom. Thereafter the viscosimeter was switched, on. Before this step care is taken taken not to allow the agitator blades to engage the hung hoses. The procedure was performed until the temperature rose more rapidly than corresponded to the normal heat supply from the ambient atmosphere, i.e. until a perceptible change in the recorded curve course occured, which curve expressed the temperature/time relationship. Simultaneously, a considerable rise of viscosity was recorded. In due time before the point of gelatination had been achieved, the grid together with the hung hoses was lifted above the liquid level, the surplus amount of the liquid, flowed downwardly and was removed. By suitably selecting the instant of grid lifting, i.e., within the interval between the rapid polymerization determined by the abrupt change in the tempeprature/time curve course or a perceptible rise of viscosity, and the point of gelatination, a desired thickness of hydrogel layer could be selected. The entire procedure can be repeated ad libitum with a fresh solution and the knitted hoses hung by their other ends in order to obtain a uniformly thick hydrogel deposit.

The aforementioned interval of lifting was predetermined by a blank test without the knitted hoses. The final products were then thoroughly rinsed in distilled water and stored in the sterile physiologic solution containing an antibiotic agent.

Analogously to the method of producing arterial substitute it is possible to prepare substitutes for veins, lymphatic ducts, biliary ducts, trachea, acoustic ducts, or the like. In the particular cases a corresponding reinforcing material made from physiologically harmless synthetic fibres in form of suitable knitwork has to be selected.

What we claim is:

1. An artificial substitute somatic organ for prosthetic use of a size to replace defective body vessels comprising a tubular insert formed of a porous tubular knitted textile material embedded within a homogeneous hydrogel which is polymerized in situ and surrounds said insert and is present within and about the pores thereof and chemically bonded to said textile material, said hydrogel comprising a polymer mixture of a first monomer selected from the group consisting of glycol monester of acrylic and methacrylic acid having one olefinic double bond in each molecule and a second monomer comprising a diester of said acrylic and methacrylic acid having at least two olefinic double bonds in each molecule, said second monomer being less than two percent of the total weight of said combined monomers.

2. The substitute according to claim 1, including a hydrogel layer containing a biologically active substance intermediate the knitted textile material and the outer covering, said intermediate layer being bonded in situ to said textile material.

3. The substitute organ according to claim 1 wherein said reinforcing insert comprises knitted polyester textile material inert with respect to said monomer mixture.

* * * * *